Patented Feb. 28, 1950

2,499,248

UNITED STATES PATENT OFFICE 2,499,248

2,13 - DIMETHYL - POLYHYDROPHENAN-THRENE LACTONE DERIVATIVES AND THE PREPARATION THEREOF

Gregory Pincus, Worcester, Robert P. Jacobsen, Shrewsbury, and Harold Levy, Worcester, Mass., assignors to G. D. Searle & Co., Skokie, Ill., a corporation of Illinois No Drawing. Application October 17, 1947, Serial No. 780,565

11 Claims. (Cl. 260—344.6)

This invention relates to 2,13-dimethyl-polyhydro-phenanthrene lactone derivatives of the following type, and to the preparation thereof:

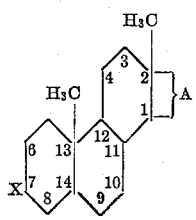

wherein X represents an oxygen function such as a hydroxyl, alkoxyl, aralkoxyl, acyloxyl, or a carbonyl oxygen group, and wherein A represents a lactone group of the empirical formula $C_3H_4O_2$, or consists of alcoholic and primary aliphatic acid substituents attached to carbon atoms 1 and 2, which can by simple lactonization form such a group. This invention relates also to salts and esters of the corresponding hydroxy acids obtained by opening the lactone ring.

We have discovered a process for preparing said polyhydrophenanthrene lactones, which comprises the oxidation of steroid 17-ketones of the following type:

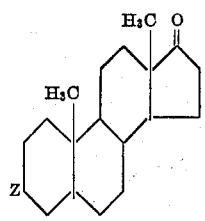

wherein Z represents an acylated, alkylated, or otherwise suitably protected hydroxyl group, which oxidation process involves their reaction with peroxides, peracids, and the like, with or without the presence of an acidic catalyst such as a sulfuric or a sulfonic acid, and which is conducted in a neutral or an acidic medium, preferably consisting of an organic carboxylic acid such as glacial or aqueous acetic acid, and at moderately low temperature for a period of several hours.

Although a preferred scheme for the oxidation process of this invention comprises the reaction of a 17-keto steroid acylate or acylate dihalide with a large excess of peracetic acid in glacial acetic acid, containing catalytic amounts of p-toluenesulfonic acid, for a period of about 24 hours at about 35° centigrade, it will be immediately apparent to one skilled in the art that the proportions and concentration of the reactants, as well as the temperature and period of the reaction, may be varied within wide limits, and that the alkane carboxylic acid reaction medium may be replaced by a tertiary alcohol or an inert solvent such as chloroform or carbon tetrachloride. For example, the oxidation may be carried out over a fairly wide range of temperature, varying from about 5° C. to as high as 70° C. At the higher temperatures the oxidation is complete within a few hours, while at 5° C. the reaction may take several days. The oxidizing agent may be hydrogen peroxide, or an aliphatic or aromatic peracid such as peracetic acid, perbenzoic acid, monoperphthalic acid, and mixtures of these agents in inert solvents such as water, alkanoic acids, tertiary alcohols, ethers, hydrocarbons and halogenated hydrocarbons. The oxidizing agents which are suitable for our processes are peroxides and have in common the —O—O— configuration. The catalysts are strong inorganic and organic acids which are not susceptible to oxidation or reduction, and include benzenesulfonic acid, the toluenesulfonic acids, sulfuric acid, phosphoric acid, alkylated sulfuric acids such as ethyl sulfuric acid, methyl sulfuric acid, propyl sulfuric acid and related esters.

When the oxygen function, Z, of the 17-keto steroid represents a hydroxyl radical we have found it desirable to protect the group against oxidation. This is conveniently done by acylation of the hydroxyl radical. Among the acyl groups which are suitable for this purpose are acetyl, propionyl, butyryl and other lower fatty acid radicals, as well as aromatic acid groups such as benzoyl, toluenesulfonyl and the like. The acylation may be carried out by treatment of the steroid with an acid halide or acid anhydride in an acylation medium.

A hydroxyl group at Z may likewise be protected against oxidation by etherification. The 2,13 - dimethylpolyhydrophenanthrene lactone derivative obtained after oxidation carries at the 7-position an ether group. Among such groups are alkoxyl radicals such as methoxyl, ethoxyl, propoxyl and similar lower alkoxyl groups, and aralkoxyl radicals such as benzyl, phenethyl, naphthylmethyl and the like.

The alcoholic hydroxyl group at the 7-position of the polyhydrophenanthrene ring can be readily converted to a keto group by oxidation. A preferred procedure involves the use of an aluminum alkoxide, such as aluminum isopropoxide or t-butoxide, and a ketone of high oxidation potential, such as cyclohexanone or acetone, since this process is specific for the oxidation of alcoholic hydroxyl groups to ketones. The 7-hydroxyl group can also be oxidized with oxidizing agents such as chromic anhydride and permanganate.

The carboxyl group of the acids obtained by the opening of the lactone ring may be converted to esters by suitable methods. Warming causes relactonization, which is a special type of esterification, viz., inner-ester formation. Treatment with diazomethane and other diazo hydrocarbons such as phenyldiazomethane results in the formation of the methyl and benzyl and related esters.

The pituitary gland, as the so-called master gland of the body, elaborates and secretes certain hormones which control and stimulate the secretions of certain other glands, including the adrenals, testes and the ovaries. The secondary glands in turn are the source of secretion of various steroid hormones. The ovarian steroid hormones, in addition to controlling phases of the menstrual cycle and organs of the female reproductive system, also act to inhibit certain phases of the activity of the pituitary gland, forming in this way a self-regulating system of physiological balance. At the time of the menopause, secretions of estrogens by the ovaries ceases or declines markedly. As a result, secretions of gonadotrophin (the hormone or hormones which stimulate the activity of the gonads to secrete estrogenic hormones) and other hormones by the pituitary often reach excessive levels since they are no longer restrained by the presence of estrogenic hormones. This tends to cause many of the unpleasant and undesirable symptoms frequently associated with the menopause. The administration of estrogenic hormone substances is known to control such symptoms, at least in part through their pituitary inhibition, but it produces undesirable estrogenic effects at the same time. Thus it will be seen that a substance which will effectively inhibit certain pituitary activity and at the same time not produce estrogenic activity is a useful, valuable and desirable addition to the field of therapeutics. It is an object of this invention to provide such substances.

The androgenic steroid hormones have also been used for the purpose of controlling pituitary gonadotrophin secretion. Thus, testosterone in certain dosages is known to inhibit pituitary hormone secretion. However, the direct androgenic effects of these steroids, such as the induction of beard and other hair growth, voice deepening and so on, is considered most undesirable. The production of substances having the effect on the pituitary without androgenic effect is therefore highly desirable. It is another object of this invention to provide such substances.

Similarly the secretion of pituitary adrenocorticotrophic hormone is affected by the circulating steroid hormones. For example, the administration of certain steroids will inhibit the secretion of adrenocorticotrophin, thereby inhibiting in turn the secretion of adrenal cortex steroid. Substances described in this application also affect adrenocorticotrophin secretion and thereby offer the opportunity to control the activities of the pituitary-adrenal cortex system.

In addition to anterior pituitary inhibition the stimulation of secretion is achieved by certain dosages of certain steroid hormones. In certain hypopituitary conditions these steroid hormones have been used to stimulate the secretory activity of the underfunctioning pituitary. Certain of the substances described in this invention have the property of stimulating pituitary hormone production but lack the androgenic activity of the parent steroids.

The polyhydrophenanthrene lactones and derivatives thereof which comprise this invention are new and useful compositions in the field of therapeutics by virtue of their ability to affect the secretion of hormones by the pituitary gland. More particularly, the new compositions of this invention are uniquely useful and valuable in medicine for the control of certain glandular disorders, because they possess little or no estrogenic or androgenic activity.

The steroid sex hormones, in addition to their specific effects on the sexual and reproductive systems of the body, have other general metabolic effects. Testosterone and other androgens, for example, stimulate protein anabolism in animals and man. This valuable property has found wide therapeutic use. In many cases it would be desirable and often necessary to exert this protein anabolic effect without influencing the sex-stimulating effects. The substances of this invention fulfill this need by virtue of their lack of androgenicity and the presence of such metabolism-stimulating activity. It is to be understood that the utility of the substances described and claimed in this application is not dependent on the mode of action thereof or on the current knowledge and theories relating to physiological processes.

These polyhydrophenanthrene lactones and derivatives thereof may be prepared from suitably constituted 17-keto steroids as specifically disclosed in the following examples (quantities of reactants are given in parts by weight). These examples are illustrative in nature and are not to be construed as limiting our invention.

*Example 1*

A solution of 1.5 parts of isoandrosterone acetate, which has the formula

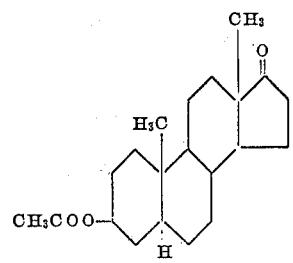

and about 0.1 part of p-toluenesulfonic acid in a mixture of about 32 parts of 1.25 molar peracetic acid in acetic acid (about 6 times the calculated amount) and about 5 parts of glacial acetic acid is allowed to stand about 24 hours at about 35° C. The nearly pure lactone acetate (melting point 157–159° C.) is obtained (in 92% yield) by gradually diluting the reaction mixture with water until crystallization is complete. This product, purified by recrystallization from benzene-neohexane, melts at 158–159.5° C. and has the composition $C_{21}H_{32}O_4$. The lactone acetate is saponified with methanolic alkali and the resulting solution is freed of methanol, chilled, and carefully acidified to about pH 3 to precipitate the corresponding dihydroxy acid. Crystallization from ethyl acetate affords a pure dihydroxy acid, melting at 170.5–171.3° C., and having the composition $C_{19}H_{32}O_4$.

When the above alkaline solution is more strongly acidified with warming, the hydroxy lactone is obtained which, when crystallized from aqueous methanol and from benzene-neohexane, melts at 169.7–169.9° C., and possesses the empirical formula $C_{19}H_{30}O_3$.

The dihydroxy acid described above is treated with an excess of ethereal diazomethane, and the resulting product is crystallized from ethyl acetate-neohexane to yield the dihydroxy acid methyl ester, $C_{20}H_{34}O_4$, melting at 118.4–118.9° C.

The oxidation of the hydroxy lactone described above with aluminum isopropoxide and cyclohexanone in refluxing toluene affords the corresponding keto lactone ($C_{19}H_{28}O_3$) which after crystallization from ethyl acetate-neohexane melts at 166–167.7° C.

*Example 2*

A solution of 2.5 parts of isoandrosterone acetate in about 20 parts of glacial acetic acid containing about 15 parts of commercial 30% hydrogen peroxide is allowed to stand at about 35° C. for about 55 hours. The reaction mixture is then gradually diluted with water and the crystalline solid (80% yield), M. P. 149.5–153° C. is collected. This crude product is hydrolyzed by heating with methanolic alkali, and a small neutral fraction is removed by chloroform extraction. The aqueous alkaline solution is then acidified and heated and the precipitated product is re-acetylated with acetic anhydride in pyridine. The acetylated material is then crystallized from benzene-neohexane to give pure lactone acetate melting at 158–159.5° C. and identical with the lactone acetate prepared as in Example 1.

*Example 3*

Androsterone acetate, which has the formula

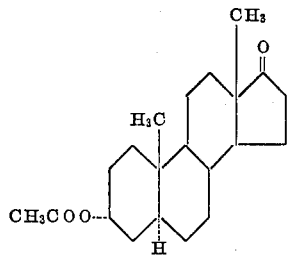

is oxidized with peracetic acid by the method of Example 1. The lactone acetate, obtained in 79% yield, is crystallized from ethyl acetate-neohexane, melts at 184.1–185.4° C., and has the composition $C_{21}H_{32}O_4$. The corresponding hydroxy lactone ($C_{19}H_{30}O_3$), M. P. 237–237.5° C., is obtained from the acetate by saponification and relactonization by the method described in Example 1.

*Example 4*

Etiocholan-3α-ol-17-one acetate, which has the formula

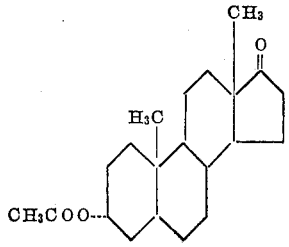

is oxidized with peracetic acid by the method of Example 1. The lactone acetate, obtained as a syrup, is not crystallized but is converted directly into the hydroxy lactone, by saponification and subsequent relactonization. The crude hydroxy lactone, obtained in about 75% yield, is purified by recrystallization from benzene-neohexane. Its formula is $C_{19}H_{30}O_3$ and it melts at 180–182.5° C.

We claim:

1. In the process for the production of 2,13-dimethyl-polyhydrophenanthrene lactones having the formula

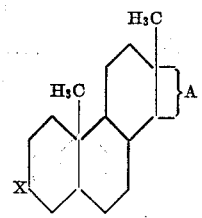

wherein X is an oxygen function of the group consisting of oxo, oxy, and acyloxy radicals, and A is a member of the group consisting of a lactone grouping of the empirical formula $C_3H_4O_2$ and the corresponding hydroxyl and aliphatic carboxylic acids substituents having an aggregate empirical formula of $C_3H_6O_3$ derived from said lactone by hydrolysis, the step which comprises oxidizing a 17-keto steroid having the formula

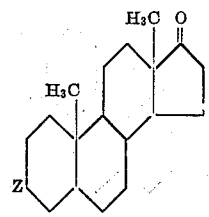

wherein Z is a protected oxy radical, with a peroxide at a temperature below about 70° C.

2. The process according to claim 1 wherein the oxidation is conducted with an excess of hydrogen peroxide in an acid solution at a temperature below 70° C.

3. The process according to claim 1 wherein the oxidation is conducted with an excess of peracetic acid containing a catalytic amount of p-toluenesulfonic acid at a temperature of about 35° C. for a period of about 24 hours.

4. A new composition of matter having the formula

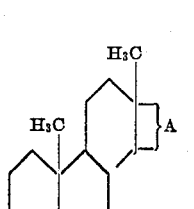

wherein X is an oxygen function of the group consisting of oxo, oxy, and acyloxy radicals, and A is a member of the group consisting of a lactone grouping of the empirical formula $C_3H_4O_2$ and the corresponding hydroxyl and aliphatic carboxylic acid substituents having an aggregate empirical formula of $C_3H_6O_3$ derived from said lactone by hydrolysis.

5. A new composition of matter having the formula

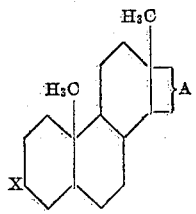

wherein X is an oxygen function of the group consisting of oxo, oxy, and acyloxy radicals, and A is a lactone grouping of the empirical formula $C_3H_4O_2$.

6. A new composition of matter having the formula

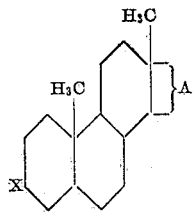

wherein X is an oxygen function of the group consisting of oxo, oxy, and acyloxy radicals, and A consists of alcoholic and primary aliphatic acid substituents having an aggregate empirical formula of $C_3H_6O_3$.

7. A new composition of matter having the formula

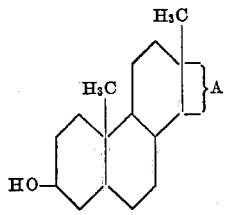

wherein A is a lactone grouping of the empirical formula $C_3H_4O_2$.

8. A new composition of matter having the formula

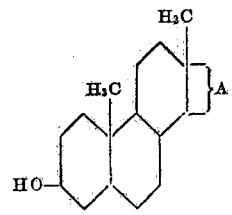

wherein A consists of alcoholic and primary aliphatic acid substituents having an aggregate empirical formula of $C_3H_6O_3$.

9. A lactone as in claim 7 having the empirical formula $C_{19}H_{30}O_3$ and a melting point of 237–237.5° C.

10. A lactone as in claim 7 having the empirical formula $C_{19}H_{30}O_3$ and a melting point of 169.7–169.9° C.

11. A hydroxy acid as in claim 8 having the empirical formula $C_{19}H_{32}O_4$ and a melting point of 170.5–171.3° C.

GREGORY PINCUS.
ROBERT P. JACOBSEN.
HAROLD LEVY.

REFERENCES CITED

The following references are of record in the file of this patent:

UNITED STATES PATENTS

| Number | Name | Date |
|---|---|---|
| 2,193,674 | Haberland | Mar. 12, 1940 |

OTHER REFERENCES

Doisy, Endocrinology, v. 30, 1942, page 936.
Miescher, Helvetica Chimica Acta, v. 27, 1944, pages 1728–1729.